(12) United States Patent
Barbeau et al.

(10) Patent No.: US 8,459,902 B2
(45) Date of Patent: Jun. 11, 2013

(54) DOCK CATWAY WITH IMPROVED NOSE PIECE, DOCK BUMPER AND PLATFORM

(75) Inventors: Claude Barbeau, Saint-Bruno (CA); Patrick Messier, Montréal (CA)

(73) Assignee: Gestion Radisson Design Inc., Repentigny (CA)

( * ) Notice: Subject to any disclaimer, the term of this patent is extended or adjusted under 35 U.S.C. 154(b) by 306 days.

(21) Appl. No.: 12/874,253

(22) Filed: Sep. 2, 2010

(65) Prior Publication Data

US 2011/0058902 A1 Mar. 10, 2011

Related U.S. Application Data

(60) Provisional application No. 61/239,453, filed on Sep. 3, 2009.

(51) Int. Cl.
*E02B 3/20* (2006.01)
*F21S 8/00* (2006.01)

(52) U.S. Cl.
USPC ............ 405/218; 405/211; 405/212; 114/219

(58) Field of Classification Search
USPC .............. 405/195.1, 211, 212, 215, 218, 219; 114/219, 263; 340/984; 362/142, 152; 264/139, 264/162, 255, 331.17; 404/9, 13
See application file for complete search history.

(56) References Cited

U.S. PATENT DOCUMENTS

| | | | | |
|---|---|---|---|---|
| 5,911,542 | A * | 6/1999 | Obrock et al. | 405/219 |
| 6,095,074 | A * | 8/2000 | Reinhardt | 114/219 |
| 6,205,945 | B1 * | 3/2001 | Passen et al. | 114/267 |
| 6,406,169 | B1 * | 6/2002 | Munsey | 362/485 |
| 2006/0029470 | A1 * | 2/2006 | Berlin | 405/4 |
| 2007/0189031 | A1 * | 8/2007 | Delmar | 362/556 |

* cited by examiner

*Primary Examiner* — David Bagnell
*Assistant Examiner* — Carib Oquendo
(74) *Attorney, Agent, or Firm* — Norton Rose Canada LLP

(57) ABSTRACT

A dock catway is comprised of a catway frame adapted at a near end to be secured to a dock. The dock catway has a nose piece structure at a far end of the catway frame. At least one dock bumper is secured to a side wall of the catway structure. A platform is provided on a top end of the catway frame. The nose piece is molded with two layers of polyethylene. An inner one of the layers is of a lighter contrasting color than an outer one of the layers, wherein the outer one of the two layers is at least partly machined to form delineations having increased translucency to conduct light from one or more internal light sources secured inside the nose piece.

17 Claims, 5 Drawing Sheets

DOCK CATWAY WITH IMPROVED NOSE PIECE, DOCK BUMPER AND PLATFORM

CROSS-REFERENCE TO RELATED APPLICATION

This application claims priority on U.S. patent application Ser. No. 61/239,453 filed on Sep. 3, 2009.

TECHNICAL FIELD

The present invention relates to a dock catway having an improved nose piece structure, a knee brace, side bumpers, as well as a platform structure.

BACKGROUND ART

Various dock structures are known and these are usually fabricated from wood deck sections held afloat on flotation casings. The deck sections are interconnected together to form walkways and catways whereby to delineate boat berths between catways. Many of these dock structures are not aesthetically pleasing as the wood quickly deteriorates with varying weather conditions and constant exposure with water and sunlight. Also, many of these docks when impacted by large crafts docking within their berths become damaged. Also, their design often does not facilitate the docking of particularly larger watercrafts. Many of these dock structures also have exposed wiring thereon which is hazardous to user persons and again, is not aesthetically pleasing. Some metal dock structures are also noisy and very costly. There is therefore a need to provide improvements of such known dock structures.

SUMMARY OF INVENTION

It is a feature of the present invention to provide a dock catway which is of an aesthetically pleasing design and which provides safety to boats as they enter a docketing space adjacent the catway.

Another feature of the present invention is to provide a dock catway having a nose piece structure fabricated as a single piece and providing visual assistance for docking a watercraft adjacent thereto.

Another feature of the present invention is to provide a dock catway having an improved dock bumper which is aesthetically pleasing, efficient to abs orb shocks without visual deformation and inexpensive to fabricate.

Another feature of the present invention is to provide a dock catway having an improved platform formed of improved deck panels.

Another feature of the present invention is to provide a dock catway which is provided with a knee brace structure which also assists in the docking of watercraft in a berth and which provides for storage area as well as a reinforcing brace for the catway.

According to the above features, from a broad aspect, the present invention provides a dock catway comprised of a catway frame adapted at a near end to be secured to a dock. The dock catway has a nose piece structure at a far end of the catway frame. At least one dock bumper is secured to a side wall of the catway structure. A platform is provided on a top end of the catway frame. The nose piece is molded with two layers of polyethylene. An inner one of the layers is of a lighter contrasting color than an outer one of the layers, wherein the outer one of the two layers is at least partly machined to form delineations having increased translucency to conduct light from one or more internal light sources secured inside the nose piece.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
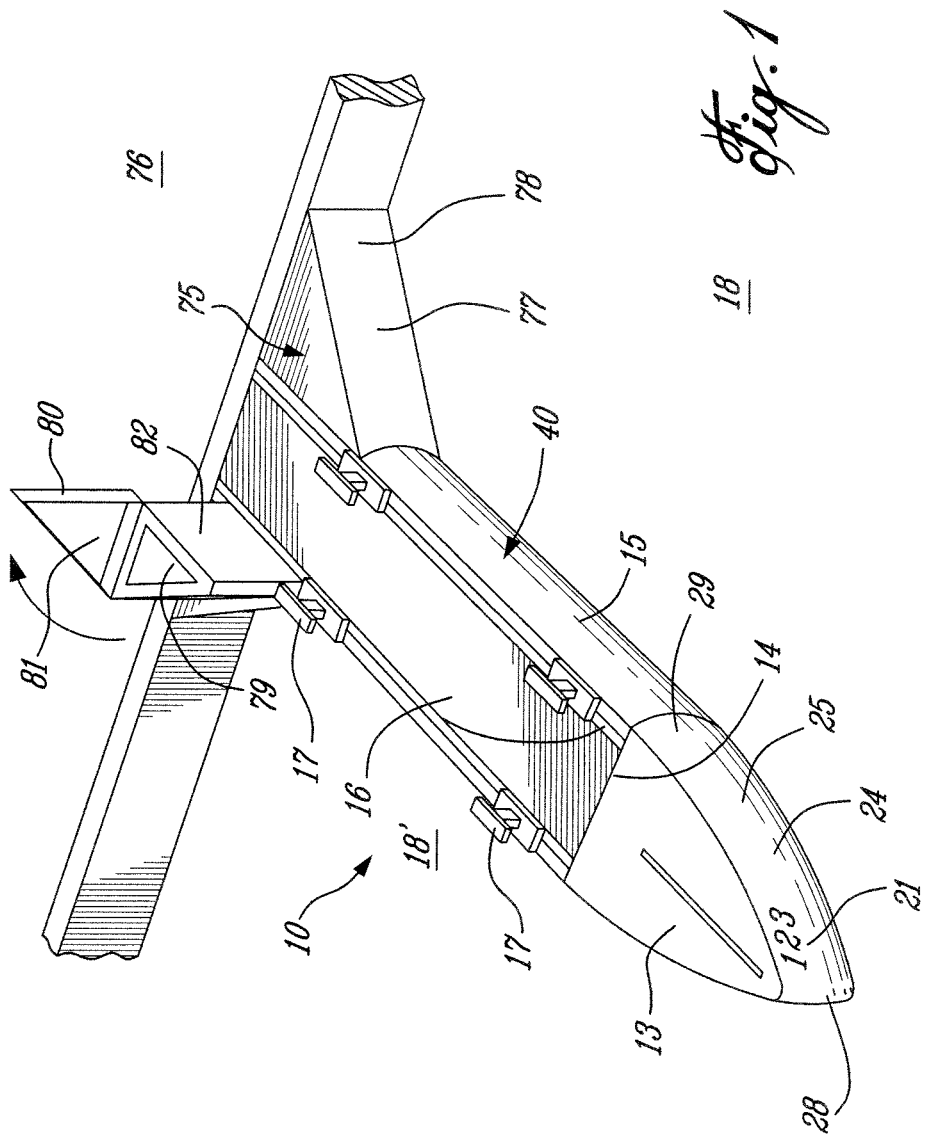
FIG. 1 is a perspective view of a dock catway constructed in accordance with the present invention.
Figure 2:
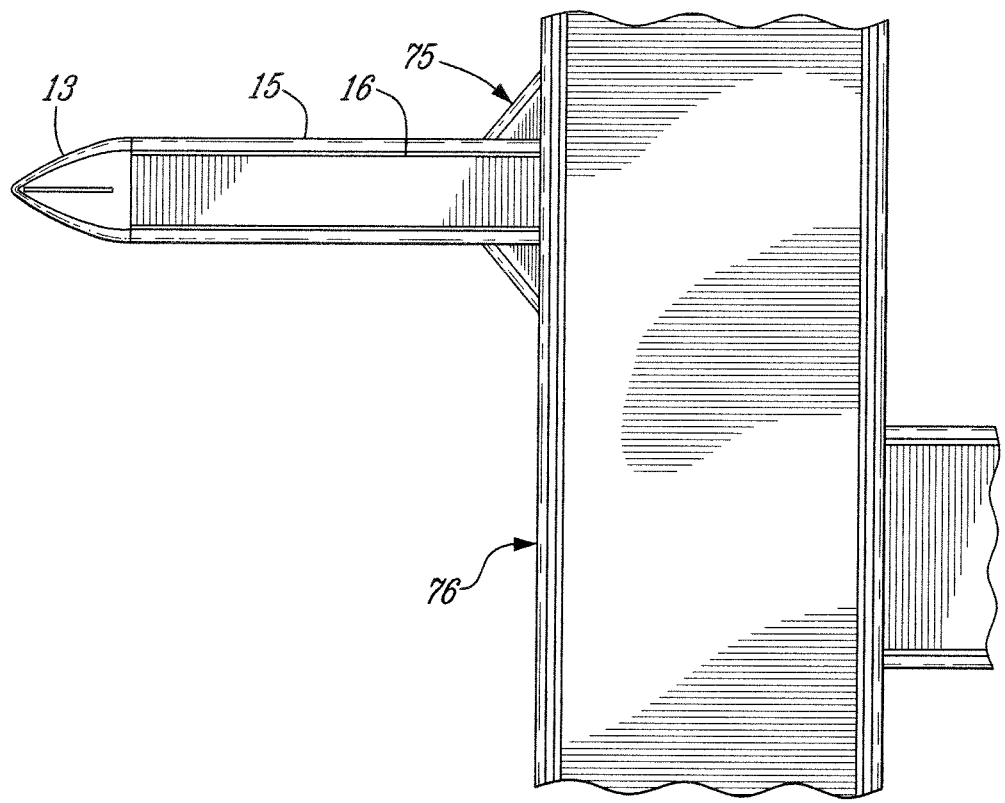
FIG. 2 is a top view showing the dock catway connected to a main dock structure.

Referring now to the drawings and more particularly to FIGS. 1 and 2, there is shown generally at 10 a catway constructed in accordance with the present invention. The catway 10 comprises a catway frame formed of extruded structural aluminum profiles including the side wall beam 12 illustrated in FIG. 3 and interconnected together by bolts or welds to form an elongated substantially rectangular catway as shown in FIGS. 1 and 2. A nose piece structure 13 is secured at a far end 14 of the catway frame. At least one dock bumper, herein an elongated dock bumper 15, is secured to the outer side wall 12' of the catway frame side wall beam 12. A platform 16 is secured on a top side of the catway frame. Cleats 17 are also secured along the outer edges of the platform 16 to provide attachment for boats parked in the berth areas 18 adjacent the catway 10.

Figure 6:
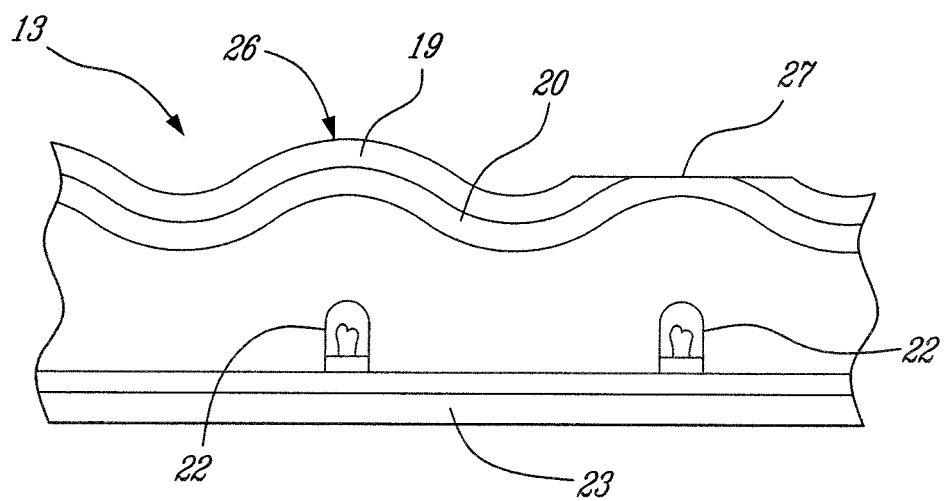
FIG. 6 is a transverse section view of a section of the co-extruded nose piece.

With additional reference to FIG. 6, the nose piece 13 is molded by co-extruding two layers of polyethylene materials 19 and 20, 19 being an outer layer and 20 being an inner layer. The inner layer 20 is formed of light colored polyethylene such as white polyethylene or other color lighter than the outer top layer color. It could also have a luminescent color. This permits the outer material 19 of the molded nose piece 13 to be engraved whereby to provide indices, such as the number of the berth as indicated by reference numeral 21 in FIG. 1 which is machined in the outer layer 19 exposing the inner layer 20 of lighter color. Thus a contrast is formed in the plastic material delineating the indicia 21 to be easily identified. In order to better identify this indicia, a light source, herein LED lights 22 are secured inside the nose piece on suitable support means 23 whereby to provide visibility of the indicia 21 at night or during foul weather. Additionally, lined profiles 24 may be formed in the side wall 25 of the nose piece and this can be accomplished by molding the nose piece with elevated profiles as shown in FIG. 6 to form ridges 26. By abrading the top surface of the ridges 26, as shown at 27, the inner lighter colored polyethylene layer 20 becomes exposed to form a contrast and for light to shine therethrough thus providing a band of light from the LED lights secured behind this band or ridge. Further, these LED lights may be illuminated in sequence from a forward end 28 of the nose piece to a rear end 29 thereof to provide a guiding visual indication to the pilot of a boat entering the berth 18 to a side of the catway.

Figure 3:
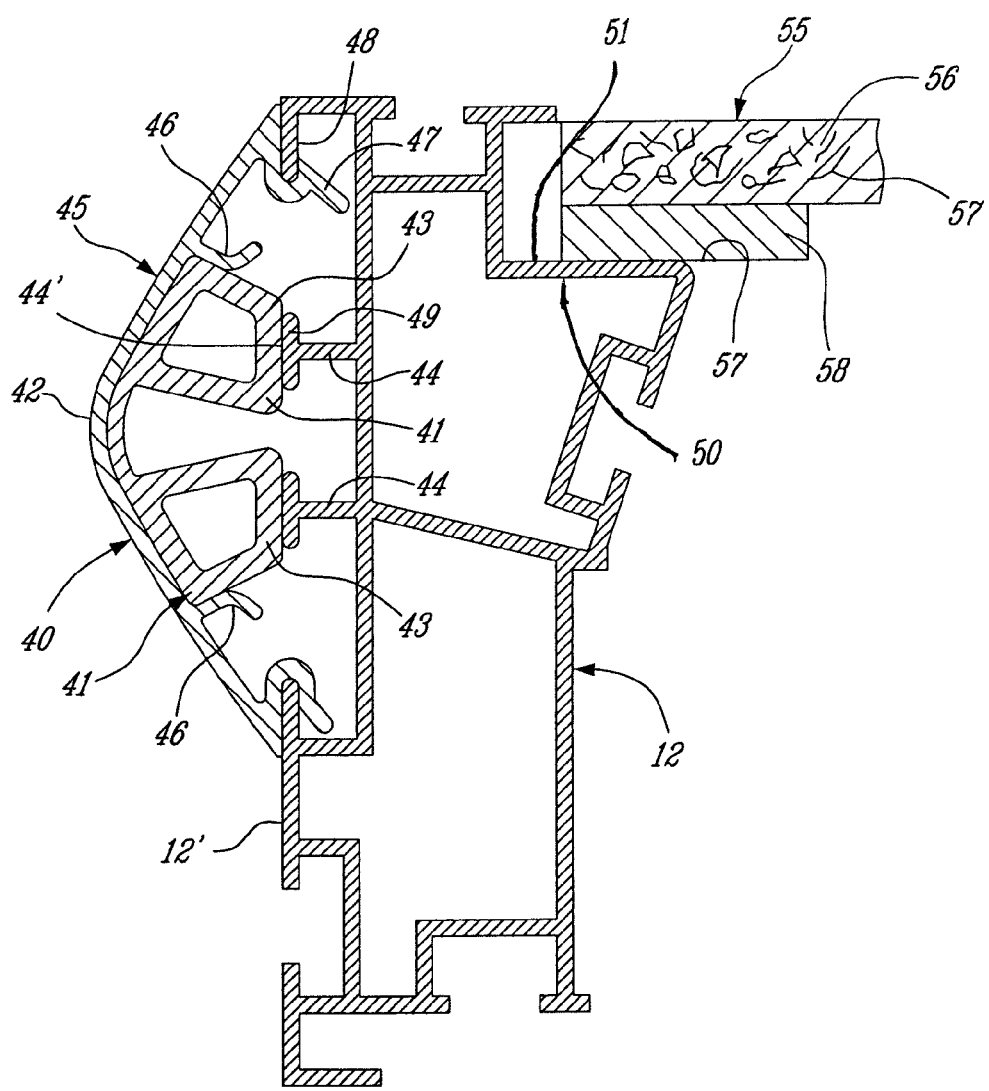
FIG. 3 is a section view illustrating the construction of the side wall of the catway frame with the dock bumper of the present invention secured thereto.

As shown in FIG. 3, the frame side beam 12 is formed of a reinforced profiled aluminum extrusion having elongated formations which are configured to secure thereto the two-part bumper 40 as hereinshown. The dock bumper 40 is comprised of an inner shock absorbing profiled bumper strip formed of EPDM rubber which has a memory and which is relatively inexpensive. The inner shock absorbing bumper strip 41 has an elongated projecting nose section 42 and one or more rear arresting formations 43 which abut against elongated T-flanges 44 of the frame side beam 12. A high density polyethylene extruded cover 45 is secured over the bumper rubber strip 41 in flush contact with the nose section 42. The extruded cover has internal restraining formations to retain the rubber bumper strip 41 at a predetermined captive position therebehind and against the flat outer surface 44' of the T-flanges 44. The cover 45 is further provided with engaging elongated formations 47 for flexible clamping engagement with retention flanges 48 formed with the side beam 12 and extending in the same plane as the abutment wings 49 of the T-flanges 44. Because the rubber bumper strip 41 is concealed, it is possible to use cheaper EPDM rubber such as black rubber which is approximately one-third the cost as compared to grey rubber bumpers which are intended to be visible. By concealing the cheaper EPDM rubber bumper strip 41 behind the cover 45 a substantial reduction in cost is achieved while providing the shock absorbing feature of exposed EPDM rubber which when of a lighter color is easy to mark when frictionally contacted by docking boats. Also, the design as herein-described provides for the cover strip to be easily removed and interchanged if damaged or if the strip needs to be of a different color or be printed with matter identifying the name of the boat occupying the berth.

Referring again to FIG. 3 it can be seen that the side beam 12 has an extruded floor support formation 50 formed longitudinally in a top section thereof. The floor support formation 50 has a horizontal inwardly projecting recessed surface 51 to support opposed edge sections of deck panels, as hereinshown supporting a concrete deck panel 55 formed of a concrete slab 56 casted with lightweight concrete and fiberglass fibers 57 to reduce weight thereof. This concrete panel has a thickness which is less than 1-½ inches, preferably 1-¼ inch and supported at opposed edge sections on high density polystyrene support boards 58.

Figure 4:
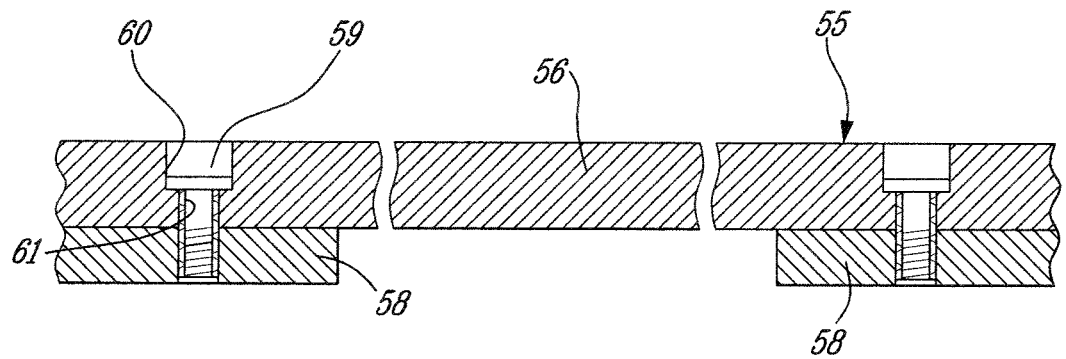
FIG. 4 is a fragmented section view showing the construction of a concrete deck panel for use in the dock platform.

Referring to FIG. 4, the construction of the concrete panel 55 is illustrated and as hereinshown the lightweight concrete panel 56 is secured to the high density polystyrene support boards 58 by bolt fasteners 59 which are inserted into bolt cavities 60 casted in the concrete panel and in which there is disposed a sound-damping nylon sleeve 61. The polystyrene support boards are non-abrasive to the support surface 51 of the floor support formation 50 and also provide sound damping.

Figure 5A:
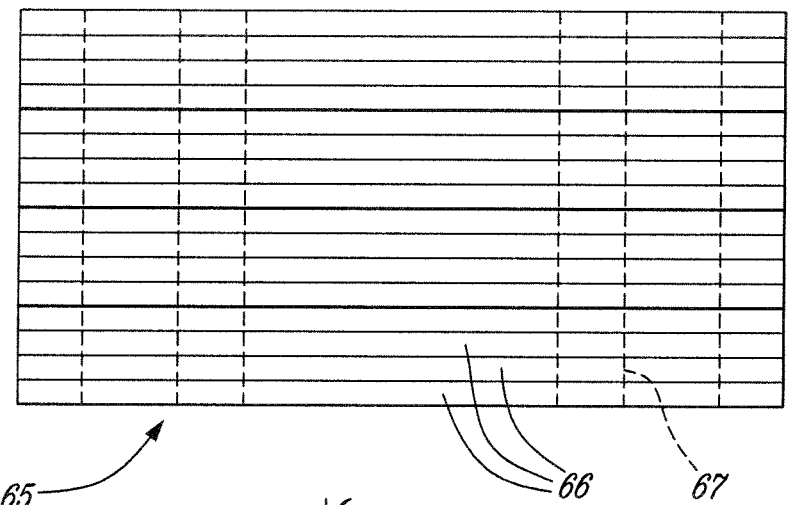
FIG. 5A is a top view showing the construction of torrified birch deck panel.
Figure 5B:
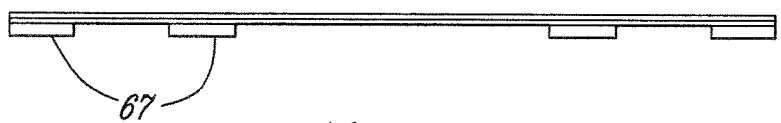
FIG. 5B is a longitudinal end view of FIG. 5A.
Figure 5C:
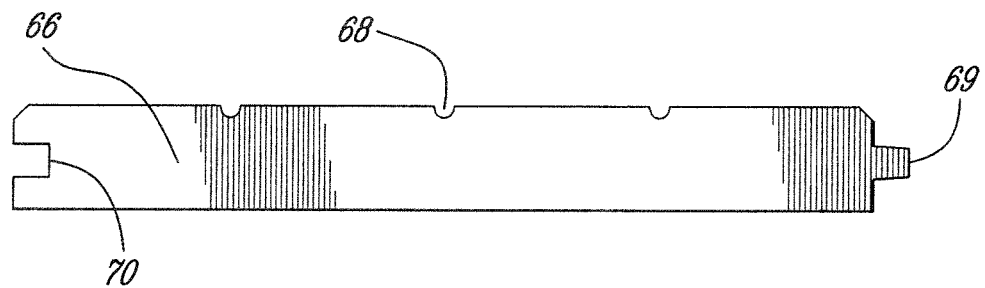
FIG. 5C is a transverse cross-section view of a torrified board used in the construction of the deck panel of FIG. 5A.

FIGS. 5A to 5C illustrate another form of deck panels, herein a deck panel formed of torrified birch boards 66. This type of wood is known in the art and was developed in Finland and does not rot or twist and is therefore excellent for use as a floor surface of docks which are constantly exposed to water and sun. These panels 55 and 65 usually have a span of 48 inches and a width of approximately 24 inches. The concrete panel 55 has a weight of about 30 lbs. whereby a single person can lift these panels when assembling the catway or decks. The torrified birch boards 66 are glued together along their longitudinal side edges and also secured to transverse members 67 by fasteners. The transverse members 67 may be formed of the same torrified birch material or could also be provided by the high density polystyrene support boards 58 as illustrated in FIG. 4. Each of the torrified birch boards 66 are provided with grooves 68 and a top surface thereof for the evacuation of water and the boards are formed with a tongue 69 along one side edge thereof and a groove 70 along the other side edge thereof for interconnection with one another.

With reference again to FIG. 1, it can also be seen that a knee brace structure 75 is secured in a juncture region of the catway 10 and a main dock or dock arm 76. The catway frame is secured at right angles to the dock arm 76 and the knee brace structure 75, which is of triangular configuration, provides added structural stability to the catway 10. The knee brace structure is hereinshown as being a molded triangular structure having at least an external vertical face wall 77 which is molded with the same two layers of polystyrene as is the nose piece 13. The external face wall 77 is further molded with one or more elevated ridges 26 as illustrated in FIG. 6 and as hereinshown a single ridge 78 is provided and abraded at a top portion thereof to expose the inner layer through which light is also visible by having LED lights mounted inside the knee brace structure. This knee brace structure 75 is a hollow structure defining an inner storage compartment 79 accessible through a hinge top door 80 which can also serve as a seat by the provision of a cushion 81 in its inner side surface. As hereinshown, a retractable box frame 82 is mounted in the compartment 79 and houses an electrical utility terminal to provide electricity to the boat which is docked in the berth 18'. When the box 82 is retracted and locked into position and the cover brought down to its fully open horizontal position the cushion provides for a seat.

It is within the ambit of the present invention to cover any obvious modifications of the preferred embodiment described herein, provided such modifications fall within the scope of the appended claims.

We claim:

1. A dock catway comprising a catway frame adapted at a near end to be secured to a dock, a nose piece structure at a far end of said catway frame, at least one dock bumper secured to a side wall of said catway structure, a platform on a top end of said catway frame, said nose piece being molded with two layers of polyethylene, an inner one of said layers being of a lighter contrasting color than an outer one of said layers, wherein said outer one of said two layers is at least partly machined to form engravings having increased translucency to conduct light from one or more internal light sources secured inside said nose piece, said nose piece being further molded with elevated profiles to form ridges, said ridges being abraded in a top portion thereof to expose said inner one of said layers to expose said lighter contrasting color layer to delineate an abraded profile with respect to said outer one of said layers.

2. The dock catway as claimed in claim 1 wherein said ridges extend along opposed side walls of said nose piece, said light sources being a plurality of LED (light emitting diode) lights secured in said nose piece behind said ridges and being illuminated in sequence from a forward end of said nose piece to a rear end thereof to provide a guiding visual indicator to a boat entering a berth on a side of said catway.

3. The dock catway as claimed in claim 1 wherein said light sources are LED light sources, said elevated profiles being line profiles.

4. The dock catway as claimed in claim 1 wherein said side wall of said catway frame is comprised of a reinforced profiled aluminum extruded side beam having elongated formations configured to secure thereto a two part fender.

5. The dock catway as claimed in claim 4 wherein said at least one dock bumper is comprised of an inner shock absorbing ethylene propylene diene monomer (EPDM) rubber bumper strip having a memory, said rubber bumper further having an elongated projecting nose section and one or more rear arresting formations, and a high density polyethylene extruded cover, said cover having restraining formations to retain said rubber bumper strip at a predetermined captive position therebehind between wall sections of said extruded side beam and an inner surface of a like elongated nose formation of said rubber bumper strip, said cover further having engaging elongated formations for clamping engagement with retention flanges of said extruded side beam.

6. The dock catway as claimed in claim 1 wherein said extruded side beam has an extruded floor support formation formed longitudinally in a top section thereof, said floor support formation having a horizontal inwardly projecting recessed surface to support opposed edge sections of deck panels thereacross, said deck panels constituting said platform.

7. The dock catway as claimed in claim 6 wherein said deck panels are one of concrete panels or torrified birch panels.

8. The dock catway as claimed in claim 7 wherein said concrete panels or torrified birch panels have a thickness of less than 1½ inches and supported at said opposed edge sections on high density polystyrene support boards, said support boards being non-abrasive to said horizontal inwardly projecting recessed surface and sound damping.

9. The dock catway as claimed in claim 8 wherein said concrete panels or torrified birch panels are secured to said support boards by fasteners disposed in nylon sleeves positioned in fastener cavities formed in said concrete panels and support boards.

10. The dock catway as claimed in claim 7 wherein torrified birch deck panels are each comprised by a plurality of elongated torrified birch boards glued together along longitudinal side edges thereof and secured to transverse support members by fasteners.

11. The dock catway as claimed in claim 1 wherein there is further provided a knee brace structure secured at a juncture region of said catway frame and said dock, said catway frame being secured at right angle to said dock, said knee brace structure being a molded triangular structure having at least an external vertical face wall thereof molded with said two layers of polyethylene.

12. The dock catway as claimed in claim 11 wherein said external vertical face wall is further molded with one or more elevated profiles to form ridges, said ridges being abraded in a top portion thereof to expose said inner layer.

13. The dock catway as claimed in claim 11 wherein said knee brace structure is a hollow structure having an inner storage compartment accessible through a hinged top wall and an electrical utility terminal inside said storage compartment.

14. The dock catway comprising a catway frame adapted at a near end to be secured to a dock, a nose piece structure at a far end of said catway frame, at least one dock bumper secured to a side wall of said catway structure, a platform on a top end of said catway frame, said nose piece being molded with two layers of polyethylene, an inner one of said layers being of a lighter contrasting color than an outer one of said layers, wherein said outer one of said two layers is at least partly machined to form engravings having increased translucency to conduct light from one or more internal light sources secured inside said nose piece, said side wall of said catway frame being comprised of a reinforced profiled aluminum extruded side beam having elongated formations configured to secure thereto a two part fender, said at least one dock bumper being comprised of an inner shock absorbing ethylene propylene diene monomer (EPDM) rubber bumper strip having a memory, said rubber bumper further having an elongated projecting nose section and one or more rear arresting formations, and a high density polyethylene extruded cover, said cover having restraining formations to retain said rubber bumper strip at a predetermined captive position therebehind between wall sections of said extruded side beam and an inner surface of a like elongated nose formation of said rubber bumper strip, said cover further having engaging elongated formations for clamping engagement with retention flanges of said extruded side beam.

15. The dock catway as claimed in claim 14 wherein there is further provided a knee brace structure secured at a juncture region of said catway frame and said dock, said catway frame being secured at right angle to said dock, said knee brace structure being a molded triangular structure having at least an external vertical face wall thereof molded with said two layers of polyethylene.

16. A dock catway comprising a catway frame adapted at a near end to be secured to a dock, a nose piece structure at a far end of said catway frame, at least one dock bumper secured to a side wall of said catway structure, a platform on a top end of said catway frame, said nose piece being molded with two layers of polyethylene, an inner one of said layers being of a lighter contrasting color than an outer one of said layers, wherein said outer one of said two layers is at least partly machined to form engravings having increased translucency to conduct light from one or more internal light sources secured inside said nose piece, there being further provided a knee brace structure secured at a juncture region of said catway frame and said dock, said catway frame being secured at right angle to said dock, said knee brace structure being a molded triangular structure having at least an external vertical face wall thereof molded with said two layers of polyethylene, said external vertical face wall being further molded with one or more elevated profiles to form ridges, said ridges being abraded in a top portion thereof to expose said inner layer.

17. The dock catway as claimed in claim 16 wherein said knee brace structure is a hollow structure having an inner storage compartment accessible through a hinged top wall and an electrical utility terminal inside said storage compartment.

* * * * *